United States Patent [19]

Ohtsu et al.

[11] Patent Number: 4,884,151
[45] Date of Patent: Nov. 28, 1989

[54] RECORDING AND/OR REPRODUCING APPARATUS WITH PHOTO-ELECTRIC IMAGE DEVICE

[75] Inventors: Masamitsu Ohtsu, Kadoma; Hiroshi Taniguchi, Hirakata, both of Japan

[73] Assignee: Matsushita Electric Inductrial Co., Ltd., Osaka, Japan

[21] Appl. No.: 153,564

[22] Filed: Feb. 1, 1988

Related U.S. Application Data

[63] Continuation of Ser. No. 793,441, Oct. 18, 1985, abandoned, which is a continuation of Ser. No. 547,456, Nov. 1, 1983, abandoned, which is a continuation of Ser. No. 180,579, Aug. 25, 1980, abandoned.

[30] Foreign Application Priority Data

Sep. 3, 1979 [JP] Japan ................................ 54-112576

[51] Int. Cl.[4] ............................................. H04N 9/491
[52] U.S. Cl. .................................... 358/330; 358/906; 358/310
[58] Field of Search ...................... 358/14, 18, 330, 16, 358/906, 310

[56] References Cited

U.S. PATENT DOCUMENTS

| | | | |
|---|---|---|---|
| 2,716,151 | 8/1955 | Smith | 358/16 |
| 2,875,271 | 2/1959 | Moore et al. | 358/16 |
| 3,716,656 | 2/1973 | Lambert et al. | 358/14 X |
| 3,974,522 | 8/1976 | Fukatsu et al. | 358/906 X |
| 4,010,490 | 3/1977 | Ota | 358/8 |
| 4,045,812 | 8/1977 | Verhoeven et al. | 358/330 |
| 4,079,412 | 3/1978 | Kosaka | 358/8 |
| 4,134,127 | 1/1979 | Campioni | 358/19 X |
| 4,178,606 | 12/1979 | Hirota | 358/4 |
| 4,188,638 | 2/1980 | de Hann | 358/4 |
| 4,193,085 | 3/1980 | Imamura | 358/325 |
| 4,200,881 | 4/1980 | Carnt et al. | 358/4 |
| 4,214,258 | 7/1980 | Van der Valk | 358/906 X |
| 4,231,061 | 10/1980 | Freeman | 358/76 |
| 4,266,241 | 5/1981 | Hzortzberg | 358/4 |
| 4,366,521 | 12/1982 | Tsunekawa et al. | 358/906 |

FOREIGN PATENT DOCUMENTS 54-140507  10/1979  Japan .

OTHER PUBLICATIONS

"Color Television Fundamentals", Kiver; McGraw-Hill Book Co., 1955, pp. 24–31.

Primary Examiner—Aristotelis M. Psitos
Attorney, Agent, or Firm—Amster, Rothstein & Ebenstein

[57] ABSTRACT

A video recording and reproducing apparatus with photoelectric image camera in which a color signal processing circuit of a recording system is simplified. For recording, a luminance signal and a chrominance signal are produced in accordance with an image being picked up through a photoelectric transducer. The luminance signal is angle-modulated, while a carrier signal having a lower frequency than the standard carrier signal is directly modulated with the chrominance signal, whereby a chrominance recording signal equivalent to a signal obtained by a frequency conversion of the standard carrier signal to a low frequency band is obtained and added with the angle-modulated luminance signal to be recorded. Upon reproduction, the angle-modulated luminance signal undergoes angle-demodulation to be converted to a reproduced luminance signal, while the color (chrominance) recording signal is frequency-converted to a high frequency band to be reproduced color signal. The reproduced luminance and color signals are added together to obtain a reproduced color video signal.

3 Claims, 9 Drawing Sheets

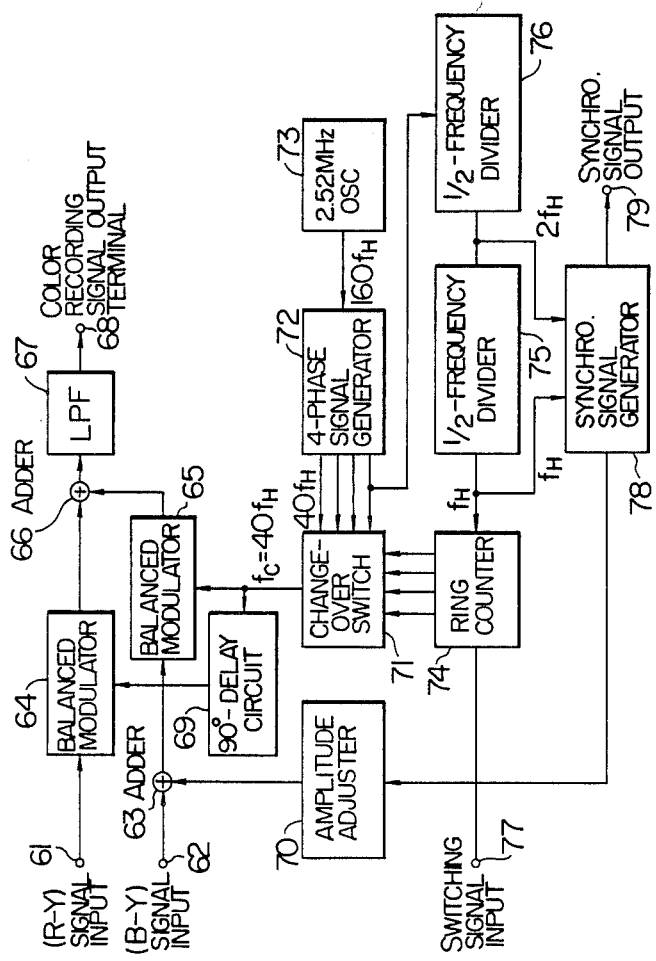
F I G. 7

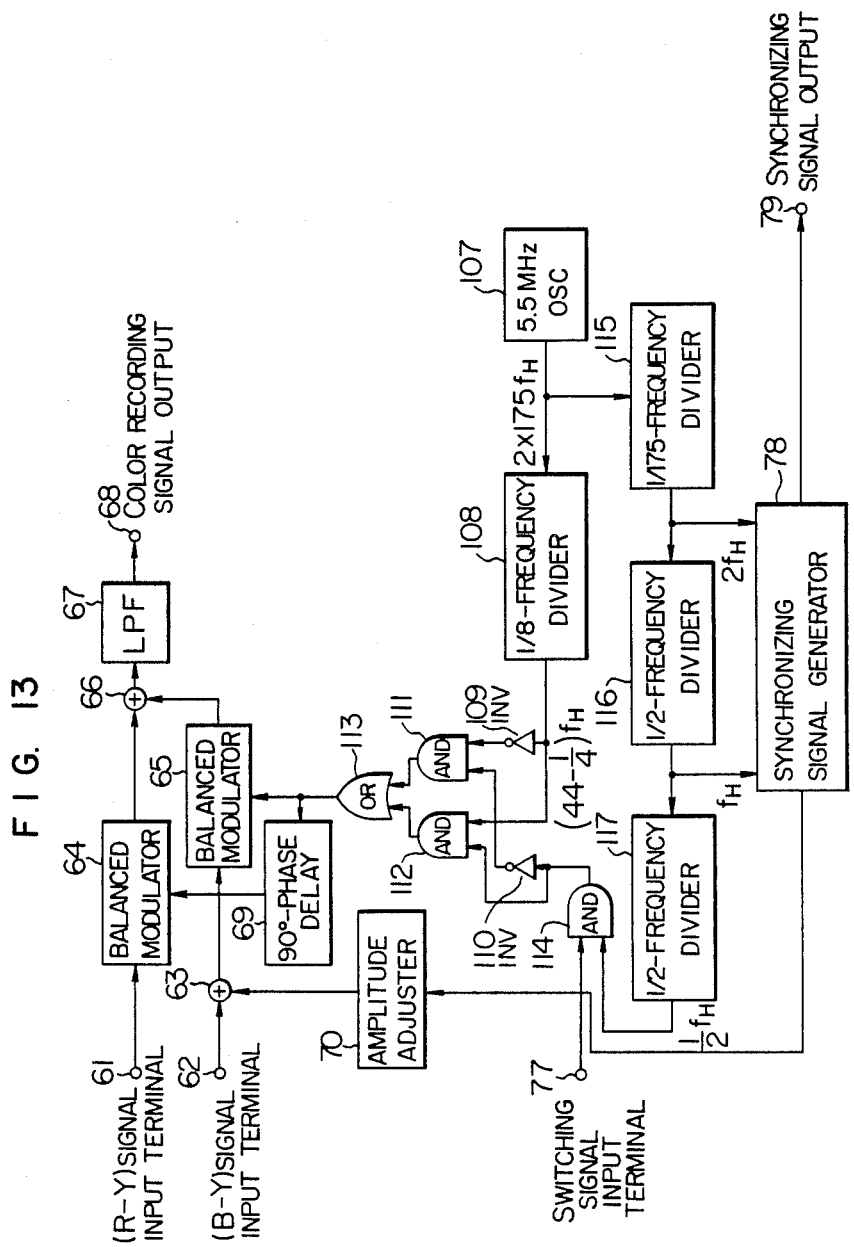

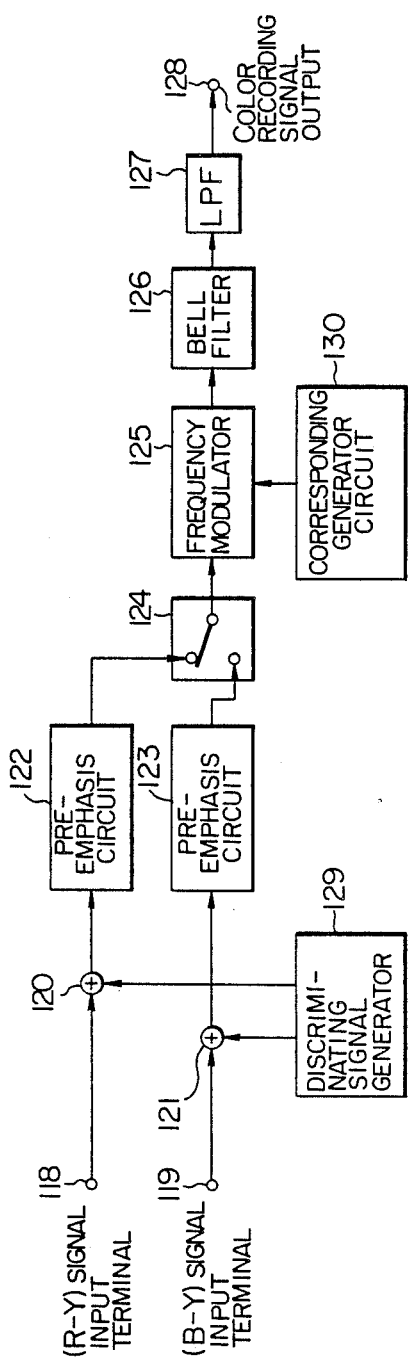
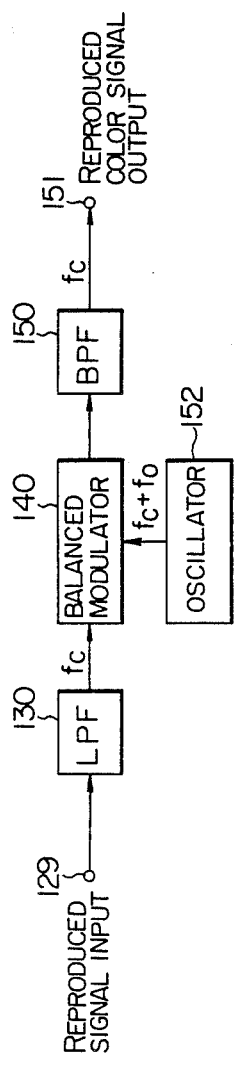

RECORDING AND/OR REPRODUCING APPARATUS WITH PHOTO-ELECTRIC IMAGE DEVICE

This is a continuation of co-pending application Ser. No. 793,441, filed on Oct. 18, 1985, which is a continuation of application Ser. No. 547,456, filed Nov. 1, 1983 which is a continuation of application Ser. No. 180,579 filed Aug. 25, 1980, all abandoned.

The present invention relates to a recording and reproducing apparatus for a color video signal. In particular, the invention concerns a recording and reproducing apparatus which incorporates an image pick-up function, and which is handy to carry, and wherein color signal recording means is simplified in the recording system.

There have been hitherto known a television camera and a portable video tape recorder for taking and recording pictures of objects in outdoors. Such recording system is advantageous over photographic recording on a light-sensitive film in respect that processing such as development or the like is not required and that reproduction may be made immediately after recording.

However, television cameras and portable video tape recorders which are commercially available at present suffer fromm shortcomings such as a heavy weight and a poor manipulability. Thus, there is a great demand for decreasing the weight of such systems.

In a conventional color television camera, a picture monitor device composed of a cathode ray tube or CRT is used for monitoring image pick-up conditions. For monitoring a color picture, a color CRT is required. However, the color CRT is expensive and heavy as compared with a black-and-white CRT. Since a purpose for monitoring the image pick-up conditions (e.g. focussing, composition, framing or the like) can be practically accomplished with the aid of the black-and-white CRT, the latter is commonly employed in connection with the conventional color television camera in consideration of lower expense and light weight.

Accordingly, when the recording condition of the picked-up picture is inspected through reproduction by means of the monitor CRT for the television camera, reproduction of color signals is unnecessary, because the color signals can not be displayed by the black-and-white CRT.

Under the circumstances, it is most convenient in the light of the whole system that a reproducing circuit for the color signal is not provided in the portable video tape recorder but in an external accessory device in order to implement the system in a small size and a light weight.

More specifically, when a picture is taken and recorded by the portable system being carried, the external accessory device is not used. When a color picture is to be reproduced, the external accessory device which is not required to be carried is connected to the portable video tape recorder system, whereby the system can be realized in a small size and a light weight with an improved manipulability.

Accordingly, it is sufficient for the processing of the color signal to provide only the recording circuit.

However, there exists a recording and reproducting apparatus in which the recording circuit shares a major circuit portion with a reproducing circuit, as will hereinafter be described. Thus, the portable video tape recorder in which only the recording circuit is provided has little significance over the recording and reproducing apparatus mentioned just above. Accordingly, in the case where only the recording circuit is provided in the portable video tape recorder with the reproducing circuit being accommodated in the external accessary device, when the portable video tape recorder is combined with the external accessary device to thereby constitute a complete recording and reproducing apparatus, a color signal processing circuit will then become about twice as large and expensive as a circuit serving both for the recording and the reproduction.

Further, the circuit of the portable video tape recorder can not be remarkably simplified, providing little contribution to the realization of the system in a small size and a light weight.

In order to have a better understanding of the present invention, description will first be made on a typical arrangement of hitherto known recording and reproducing apparatus for a color video signal. FIG. 1 illustrates in a block diagram the principle of image pick-up, recording and reproducing operations, according to prior art. In the figure, reference numeral 1 denotes an image pick-up device or camera tube, 4 denotes a recording system, 11 denotes a reproducing system, and 18 designates an output terminal for a reproduced video signal. The camera tube 1 comprises a photoelectric transducer 2 which serves to produce signals representing color primaries, i.e., R-signal, G-signal and B-signal in dependence on the image being picked up. Since the photoelectric transducer 2 is well known in the art, detailed description thereof will be omitted. These three signals are supplied to an encoder 3 which then produces at the output thereof a standardized or normalized color video signal which is commonly referred to as a composite color television signal. This signal will hereinafter be termed the color video signal for simplification. Of course, the encoder 3 is implemented in different arrangements in dependence on color television standards such as NTSC, PAL and SECAM systems. Since the structures of the encoder 3 are adapted for these different standards, detailed description will be unnecessary. However, it should be remarked that, in any cases, R-signal, G-signal and B-signal are converted into a luminance signal (Y-signal) and two color difference signals (R-Y signal and B-Y signal) through a matrix circuit.

The two color difference signals are then modulated in accordance with the adopted standard into a carrier chrominance signal (hereinafter referred to also as the color signal) of a higher frequency band than that of the luminance signal. The color signal is subsequently superposed on the luminance signal, whereby a color video signal is produced. For example, in the case of a NTSC system, the carrier frequency of 3.58 MHz is subjected to a quadrature phase modulation by R-Y signal and B-Y signal, the resultant color signal being superposed in a higher frequency band than that of the luminance signal, as is illustrated in FIG. 2.

The color video signal from the encoder 3 is applied to a low-pass filter (LPF) 5 and a band pass filter (BPF) 6 of the recording system 4. In practice, when the image pick-up camera is separated from a portable video tape recorder or VTR, the output from the encoder 3 is coupled to the recording system 4 by way of a connecting cable and connector terminals (not shown in FIG. 1). On the other hand, in case the camera 1 and the recording system 4 are integrated in a unit, the electric connection therebetween is effected through connecting wires. Through the low-pass filter 5, only the luminance signal is separated, while the color signal is separated through the band pass filter 6. The luminance signal and the color signal are supplied to a luminance signal recording circuit 7 and a color signal recording circuit 8, respectively.

Although there are available various signal processings in accordance with the recording and reproducing standards, it is common in practice that the luminance signal undergoes a frequency modulation (FM) in the luminance signal recording circuit 7 to be produced as a luminance recording signal.

On the other hand, the color signal is subjected to a signal processing in accordance with the adopted standard in the color signal recording circuit 8, whereby a color recording signal is produced at the output of the circuit 8.

The luminance recording signal and the color recording signal are added together through an adder circuit 9 and applied to a magnetic recording head 10 to be recorded on a magnetic recording medium (e.g., a magnetic tape not shown).

It should be noted that these recording signals are different in dependence on the various types of the recording systems. For example, in the case of the video tape recorder of VHS system which is now commercially available, the luminance recording signal is frequency-modulated so that it has a frequency of 3.4 MHz at a synchronous tip level and a frequency of 4.6 MHz at a white peak level, while the color recording signal is converted to a low-band signal so that the color subcarrier of the color signal has a frequency of 630 KHz, as can be seen from FIG. 3. However, this is the case for recording the color video signal in accordance with the standard for NTSC system.

For reproduction, the signal recorded on the magnetic recording medium is picked up by a magnetic reproducing head 12 and supplied to a high-pass filter of HPF 13 and a low-pass filter or LPF 14. The high-pass filter 13 serves to separate only the reproduced luminance recording signal that is supplied to a luminance signal reproducing circuit 15 where the signal undergoes the signal processing in the sense opposite to the processing for the recording operation (e.g., frequency demodulation when the reproduced luminance signal has been frequency-modulated).

Thus, the reproduced luminance signal is produced from the output of the luminance signal reproducing circuit 15. On the other hand, at the low-pass filter 14, only the reproduced color recording signal is separated and applied to a color signal reproducing circuit 16 to be processed in the manner reverse to the processing for the recording (e.g., the reproduced color recording signal is converted into a signal of a high frequency band when the former has been converted into the color signal of a low frequency band upon recording). In this way, there is produced the reproduced color signal at the output of the low-pass filter 14. Subsequently, the reproduced luminance signal and the reproduced color signal are supplied to an adder 17 to be added together, whereby a reproduced color video signal appears at the output terminal 18.

As will be appreciated from the foregoing description of the typical one of the conventional color video signal recording and reproducing apparatus, the recording process in which the color video signal is separated into the luminance signal and the color signal which are then recorded separately after having undergone respective processing as is illustrated in FIG. 1 (this recording process will hereinafter be referred to as the separate type recording process) is usually adopted in a handy or portable type video tape recorder or VTR in addition to a direct angle-modulation type recording process according to which the color video signal is directly angle-modulated to be recorded without being separated into the luminance signal and the color signal for separate processing (the so-called angle-modulation type recording process).

The separate type recording process is dominantly adopted in the case of the conventional handy type VTR for domestic use in consideration of effective utilization of band width, variation in time base (jitter) which is likely to occur in the recording and reproducing system. and transmission distortions (DG, DP) of the color signal. Further, in the case of the separate type recording process, it is common in practice that the luminance signal is recorded after the angle-modulation (usually frequency modulation). Since the signal processing of the luminance signal for this purpose is known in the art, detailed description thereof will be omitted.

Concerning the color signal, there exist various standards for the color video signal processing such as NTSC, PAL and SECAM, as described hereinbefore. Correspondingly, there have been developed various recording and reproducing procedures, involving various signal processing systems.

By way of example, description will be made of a hitherto known system for recording and reproducing the color video signal according to the NTSC standard with the aid of a low-band conversion technique. FIG. 4 shows schematically this system in a block diagram, in which the like parts as those shown in FIG. 1 are denoted by the same reference numerals as those used in FIG. 1.

The R-signal, G-signal and B-signal delivered from the photoelectric transducer 2 are supplied to a converter circuit 19 for converting these signals into Y-signal, (R-Y) signal and (B-Y) signal. As is well known in the art, the converter circuit 19 is composed of a matrix circuit, a low-pass filter for limiting the band of the output signals from the matrix circuit and delay lines for adjusting the timing of these signals, although these circuit components are not shown in the figure. It will be noted that a similar converter circuit is also employed in the case of the PAL or SECAM system, difference residing in the subsequent signal processing.

The Y-signal is applied to an adder 22, while R(R-Y) signal and (B-Y) signal are applied to a quadrature phase modulator 21.

The quadrature phase modulator 21 is additionally supplied with a color subcarrier signal having a frequency of 3.579545 MHz from a synchronizing signal generator 20. With the aid of the color subcarrier signal, (R-Y) signal and (B-Y) signal are modulated in quadrature phase modulator 21 to be converted into the color signal which is then supplied to the adder 22. Further, a synchronizing signal (inclusive or horizontal synchronizing signal, vertical synchronizing signal and a color burst signal) is applied to the adder 22 from the synchronizing signal generator 20 to be added to the Y-signal and the color signal resulting in that a color video signal is produced from the output of the adder 22. Additionally, the synchronizing signal generator circuit 20 is adapted to produce a control signal for controlling the photoelectric transducer 2. Detail of the synchronizing signal generator circuit 20 will be elucidated hereinafter.

The color video signal delivered from the adder 22 is applied to the low-pass filter 5 and the band pass filter 6 to be separated into the luminance signal (or Y-signal) and the color signal. The luminance signal is supplied to the luminance signal recording circuit 7 and hence to the adder 9 after the frequency modulation. On the other hand, the color signal is supplied to a balanced modulator 23 to be balance-modulated with a converting signal supplied from a converting signal generator 25 and subsequently only the difference frequency component is separated through the low-pass filter 24 to be supplied to the adder 9 as the color recording signal.

As will be seen from FIG. 3, the color recording signal is the one in which the color signal is frequency-converted into a low band. The converting signal generator circuit 25 may take various circuit configurations in conformity with various recording and reproducing systems. However, in the case of VHS system which is one of the recording and reproducing systems for the simple or handy type video tape recorder (e.g., for domestic use), the circuit arrangement is made such that the phase of the converting signal output from the converting signal generator circuit 25 is advanced by 90° for each horizontal scanning period during the recording along a certain track and is delayed by 90° for every horizontal scanning period during the recording on a succeeding or next track. As the consequence of the signal processing in the manner described above, spectrum of the color recording signal recorded in adjacent recording tracks are in a frequency-interleaved relation, making it possible upon reproduction to eliminate the cross-talk components derived from the adjacent track by using a comb filter composed of a delay line exhibiting a delay corresponding to a single horizontal scanning period. For further particulars, reference should be made to Japanese Laid-Open patent application No. 48919/1977 which is also referred to in the description of the exemplary embodiment of the invention. It should be noted that, in addition to VHS system described above, a β-system in also known for the signal processing in which spectrum of the color recording signal are frequency-interleaved between the adjacent recording tracks, as is disclosed in Japanese Laid-Open patent application No. 104824/1975 to which reference is to be made for details of the β-system.

Through the adder 9, the luminance recording signal and the color recording signal are combined together into a recording signal which is then supplied to the magnetic recording head 10 to be recorded on the magnetic recording medium such as a magnetic tape.

Upon reproducing operation, the recording signal is picked up from the recording medium by means of the reproducing magnetic head 12 and supplied to the high-pass filter 13 and the low-pass filter 14 to be separated into the reproduced color recording signal and the reproduced luminance recording signal which are then applied, respectively, to a balanced modulator 26 and the luminance signal reproducing circuit 15. The reproduced luminance recording signal is frequency-demodulated by the luminance signal reproducing circuit 15 into a reproduced luminance signal which is then supplied to an adder 17. In the balanced modulator 26, the reproduced color recording signal is balance-modulated with the aid of the converting signal delivered from the converting signal generator circuit 25, and only the sum frequency component of the reproduced color recording signal and the converting signal are separated through the band pass filter 27 and supplied to the adder 17 as the reproduced color signal. It should be mentioned that, when the recording state is to be inspected upon reproduction, the reproduced color video signal is supplied to a picture monitor display from the output terminal 18, although such monitor arrangement is not shown in the figure.

In the foregoing, a typical one of the hitherto known color video signal recording/reproducing apparatus has been briefed. The problems and difficulties of the conventional apparatus will now be clarified.

The picture monitor device for the conventional color television camera (image pick-up device) is usually designed for display in black and white. For the portable video tape recorder, the reproducing circuit for the color signal is unnecessary. Accordingly, in an attempt to simplify the circuit arrangement, it can be conceived to constitute the color signal processing circuit only by the recording circuit.

However, since the converting signal generator circuit 25 is much complicated and occupies a large portion of the whole circuit arrangement, the simplification of the circuit as a whole can not be attained to a desired degree, even when the color signal reproducing circuit (including the low-pass filter 14, the balanced-modulator 26 and the band pass filter 27) is removed. Further, because the balanced modulator 26 is usually adapted to serve also as the balanced modulator 23, it is impossible to spare the balanced modulator 26.

In other words, the hitherto known recording/reproducing apparatus is disadvantageous in these respects as described above.

An object of the present invention is to provide an image or picture recording and/or reproducing apparatus having an image pick-up capability of a small size and a light weight in which a color signal processing circuit for the recording system is implemented in a much simplified configuration.

In view of the above and other objects which will become more apparent as description proceeds, there is proposed according to a general feature of the invention an image recording and/or reproducing apparatus with an image pick-up device, which apparatus comprises a recording system composed of an image pick-up device for producing a luminance signal and a chrominance signal in dependence on an image to be recorded, means for angle-modulating the luminance signal, means for generating a carrier signal of a lower frequency than that of a standard color subcarrier, means for modulating the carrier signal with the chrominance signal thereby to produce a color recording signal, and means for adding the angle-modulated luminance signal and the color recording signal, and a reproducing system composed of means for producing a reproduced luminance signal by demodulating the angle-modulated luminance signal, means for conventing the frequency of the color recording signal to a high frequency band thereby to produce the reproduced color signal, and means for adding the reproduced luminance signal and the reproduced color signal to thereby produce a reproduced color video signal. In a preferred embodiment of the invention, the image pick-up device is integrally combined with the means for recording the luminance signal and the chrominance signal delivered from the image device, as a result of which the color signal processing circuit can be implemented in a much simplified circuit arrangement, whereby the image recording and- /reproducing apparatus having the image pick-up function and implemented in a small size and a light weight can be accomplished inexpensively.

It is one of the great advantages of the present invention that the video recording and reproducing apparatus incorporating an image pick-up device therein can be manufactured in a small size and a light weight while the color signal recording circuitry can be implemented in a much simplified configuration. Thus, the video recording and reproducing apparatus imparted with the image pick-up function according to the invention is far excellent over the hitherto known apparatus of this kind, in respect of manipulability and portability.

The invention will become more apparent from the description of preferred embodiments of the invention. The description refers to the drawings, in which:

FIG. 7 is a block diagram to illustrate details of a portion of the apparatus shown in FIG. 5;

FIGS. 13 and 14 show in block diagrams further circuit configurations corresponding to the one shown in FIG. 7; and FIG. 15 shows in a block diagram a version of the circuit arrangement shown in FIG. 14.

Figure 1:
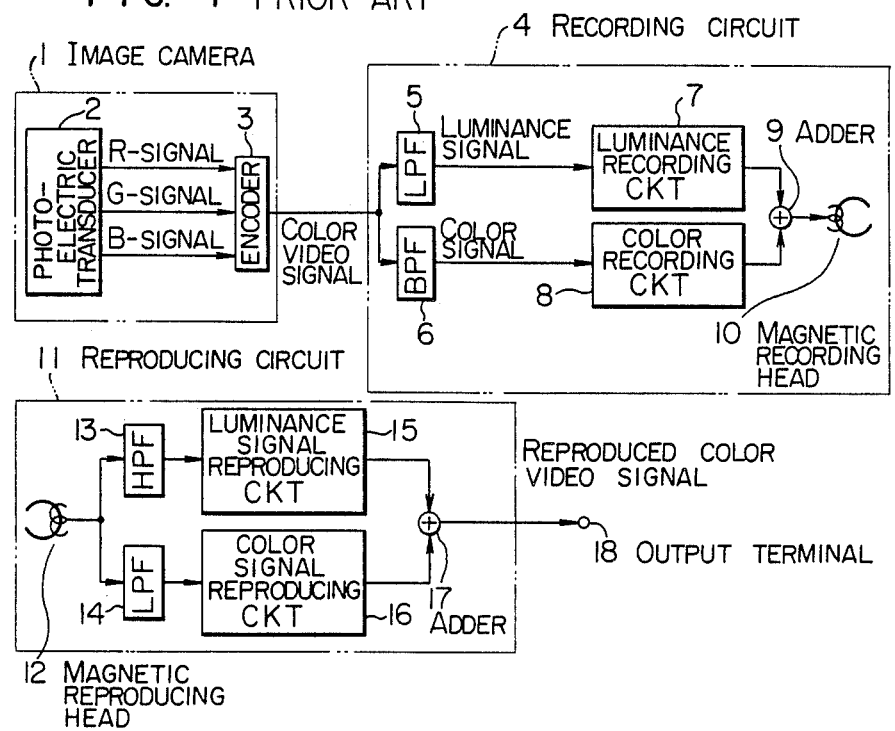
FIG. 1 shows in a block diagram a general circuit arrangement of a hitherto known recording and reproducing apparatus inclusive of an image pick-up camera.
Figure 2:
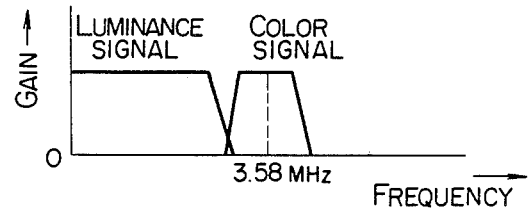
FIGS. 2 and 3 show spectral diagrams to illustrate operations of the apparatus shown in FIG. 1.
Figure 3:
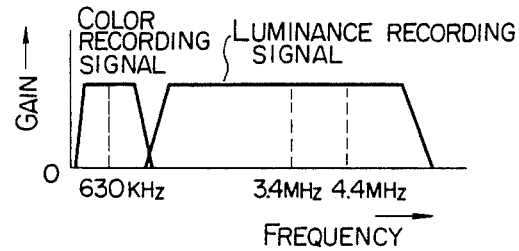
Figure 4:
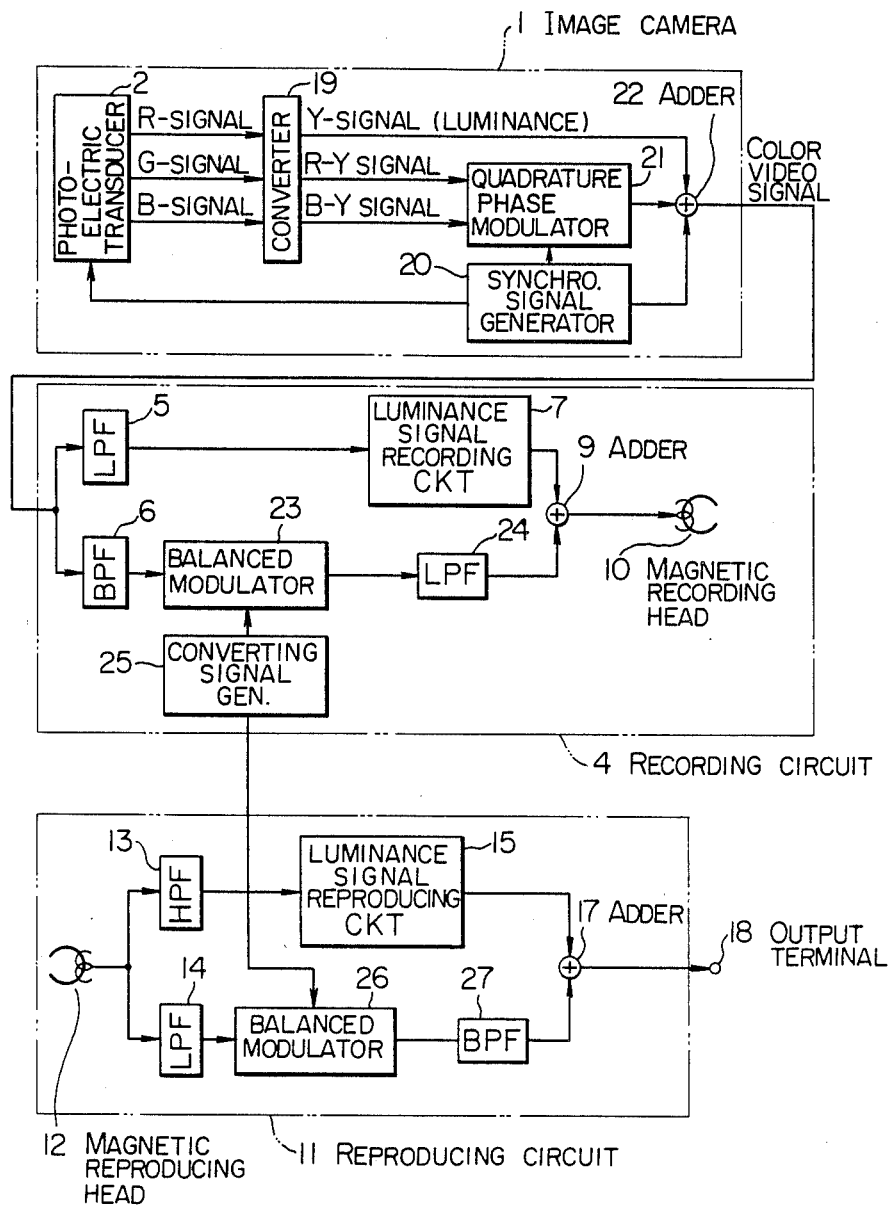
FIG. 4 is a block diagram showing schematically a hitherto known apparatus for recording and reproducing a color video signal according to the NTSC standards.
Figure 5:
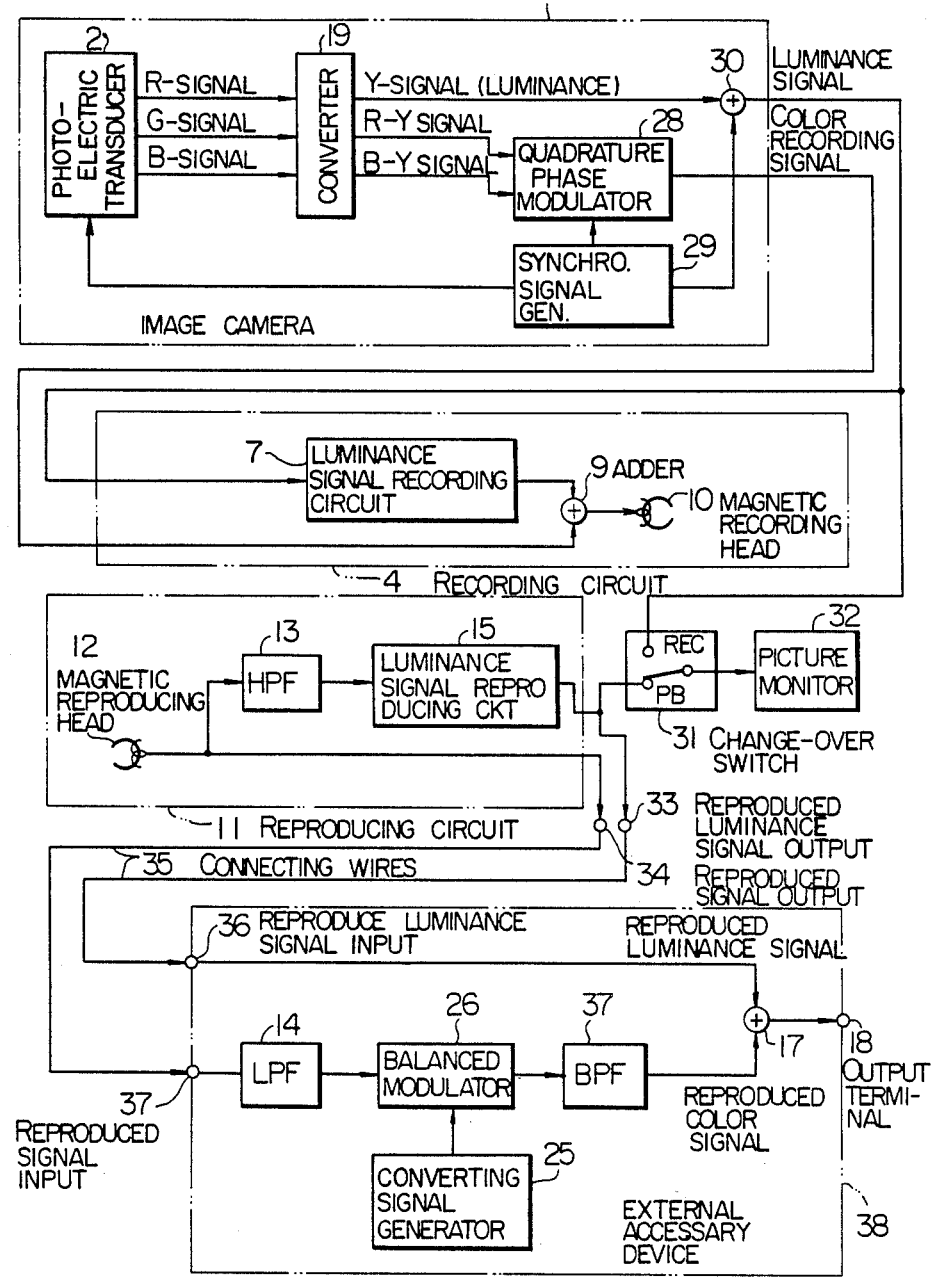
FIG. 5 shows in a block diagram a general and fundamental arrangement of a video recording and reproducing apparatus with a photoelectric image device according to an embodiment of the invention.

Now the invention will be described by referring first to FIG. 5 which is a block diagram showing an exemplary embodiment of the invention. In the figure, reference numeral 1 denotes an image pick-up device such as image pick-up tube or camera, 4 denotes a circuit of a recording system, 11 denotes a circuit of a reproducing system, 32 denotes a picture monitor device, 38 denotes an external accessory device and 18 denotes an output terminal. In FIG. 5, those parts same as or similar to the ones shown in FIG. 4 are attached with the same reference numerals and detailed description thereof is not repeated.

In the recording operation mode, signals representing an image being picked up, that is Y-signal (luminance signal), (R-Y) signal and (B-Y) signal are produced from the converter circuit 19. The Y-signal is applied to an adder 30.

On the other hand, (R-Y) signal and (B-Y) signal are fed to a quadrature phase modulator 28 to be modulated with a carrier signal delivered from a synchronizing signal generator circuit 29, whereby a color recording signal is obtained. This carrier signal is different from the standard color subcarrier signal having a frequency of 3.58 MHz, as described hereinbefore in conjunction with FIG. 4 and is similar to the carrier signal (e.g., of 630 KHz) for the color recording signal which is obtained through the frequency conversion of the color signal to the lower band, as described hereinbefore in context with FIG. 4. In other words, through signal processing such as the frequency conversion to a low band or the like, the color recording signal (converted to the low band) can be directly obtained from (R-Y) signal and (B-Y) signal. This is an important feature of the invention and will hereinafter be described in detail in conjunction with the synchronizing signal generator circuit 29. The synchronizing signal which is produced by the synchronizing signal generator circuit and contains the horizontal synchronizing signal and the vertical synchronizing signal is applied to the adder 30 to be added with the Y-signal delivered from the converter circuit 19, resulting in the luminance signal output from the adder 30.

The luminance signal thus obtained and the color recording signal produced from the quadrature phase modulator circuit 28 are applied to the circuit of the recording system. Additionally, the luminance signal is applied to a change-over switch 31 which is closed to a contact REC in the recording operation. Thus, the luminance signal is fed to the picture monitor device 32 through the change-over switch 31 to be displayed on the monitor screen.

The luminance signal undergoes frequency modulation (which depends on the type of recording system with other type of modulation being able to be adopted), in the luminance signal recording circuit 7, whereby the luminance recording signal is obtained and applied to the adder 9. On the other hand, the color recording signal is directly applied to the adder 9 to be added with the luminance recording signal and subsequently recorded on a magnetic recording medium (e.g., a magnetic tape not shown) by means of the recording head 10.

Upon reproducing operation, the signal read by the reproducing head 12 is supplied to the high-pass filter 3 and the output terminal 34 for the reproduced signal. The high-pass filter 13 serves to separate only the reproduced luminance recording signal which is then supplied to the luminance signal reproducing circuit 15 and undergoes frequency demodulation, as a result of which the reproduced luminance signal is obtained. The reproduced luminance signal is then applied to the reproduced luminance signal output terminal 33 by way of the change-over switch 31. Since the change-over switch 31 is closed to the contact PB in the reproducing operation, the reproduced luminance signal is supplied to the picture monitor display 32 through the change-over switch 32 to be displayed on the monitor screen in the form of an image in black and white. The picture monitor device 32 is designed to display an image in black and white and is adequate for practical purpose to inspect the recording conditions (presence or absence of record, contents of the record or the like) through reproduction effected immediately after the recording. However, a color signal reproducing circuit is requied when the recorded color picture is to be displayed on a color television monitor, although such color signal reproducing circuit can be omitted in the case where the reproduction of a recorded image is to be carried out while the video recording and reproducing apparatus is carried by the user.

The color signal reproducing circuit is accommodated within the external accessory device 38. When the reproducing color picture is to be displayed on the color television monitor, the signals appearing at the reproduced luminance signal output terminal 33 and the reproduced signal output terminal 34 are applied to a reproduced luminance signal input terminal 36 and a reproduced signal input terminal 37, respectively, of the external accessory device 38 through wire connection 35. The reproduced luminance signal applied to the input terminal 36 of the accessary device 38 is then supplied to the adder 17.

On the other hand, the reproduced signal supplied to the input terminal 37 is supplied to the low-pass filter 14 where only the reproduced color recording signal is separated and fed to the balanced modulator 26.

The balanced modulator 26 is supplied with the converting signal from the converting signal generator circuit 25 and performs the balanced modulation of the reproduced color recording signal. The output signal from the balanced modulator 26 is then supplied to the band pass filter 27 through which only the sum frequency component is separated, whereby the reproduced color signal is obtained. The reproduced color signal is supplied to the adder 17 to be added with the reproduced luminance signal to thereby produce the reproduced color video signal which appears at the output terminal 18. The reproduced color video signal is supplied to a color television monitor to be displayed thereon as a color image or picture, although this arrangement is not shown in FIG. 5. The converting signal generator 25 may be implemented in a same structure as that of the converting signal generator circuit which has been used in the hitherto known recording-/reproducing apparatus (shown in FIG. 4). In other words, according to the teachings of the invention, the color recording signal is produced in such a manner that the magnetic tape which carries information recorded by the recording/reproducing apparatus according to the invention can be used for reproduction by a conventional recording/reproducing apparatus without any difficulty (i.e. with compatibilty). To this end, the converting signal generator circuit 25 which is used in the reproducing operation for the color signal is of the configuration similar to the one shown in FIG. 4.

Since the converting signal generator circuit 25 is also used in the color signal recording circuit according to the prior art, description in detail will be made on this circuit with a view of clarifying the difference between the present invention and the prior art. Further, in an attempt to make clear what type of color signal is to be produced, elucidation of the relevant portion of the arrangement shown in FIG. 4 will again be described.

Figure 6:
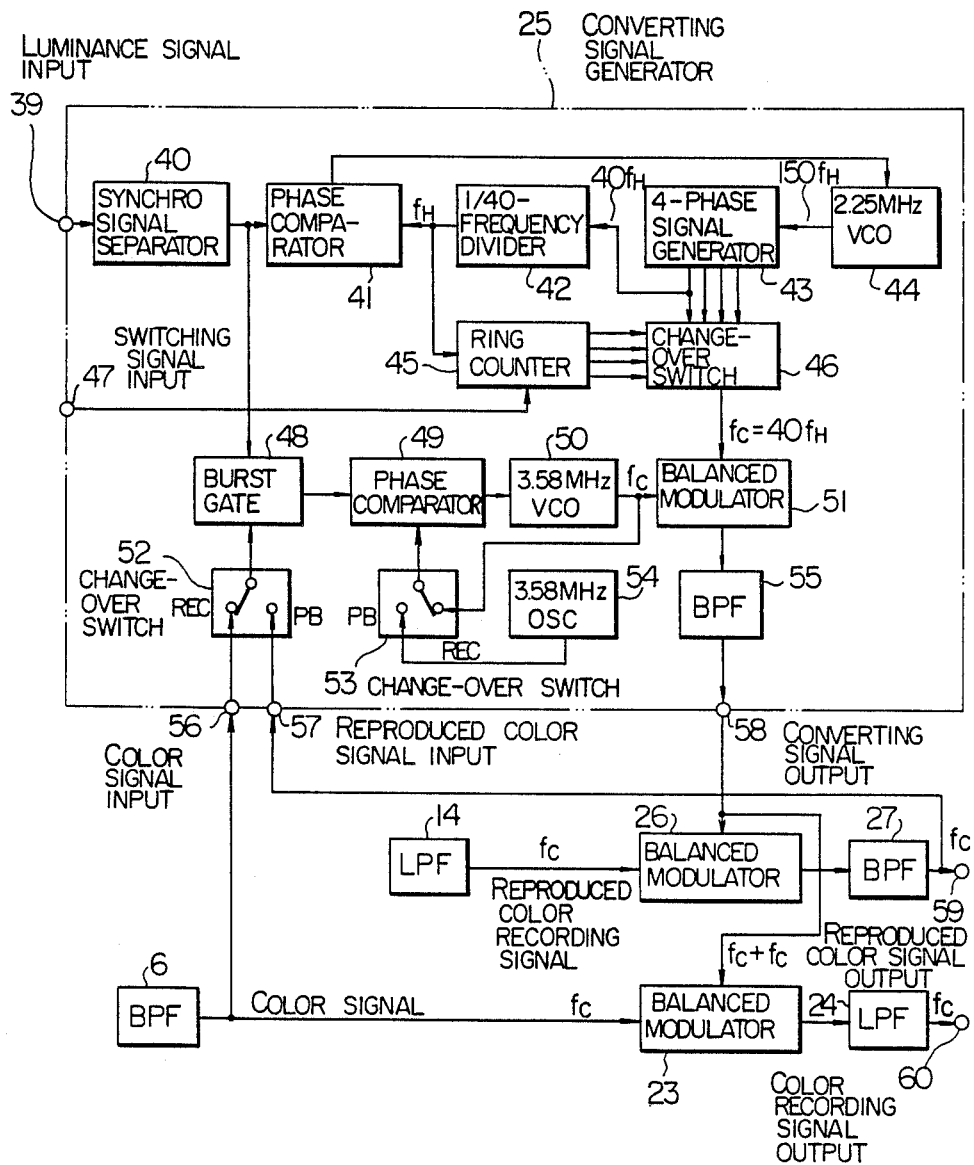
FIG. 6 shows in a block diagram a detailed circuit arrangement of a portion of the apparatus shown in FIGS. 4 and 5.

FIG. 6 shows in a block diagram the converting signal generator circuit 25 together with the remaining portion of the color signal processing circuit. In this figure, the elements same as or similar to those shown in FIGS. 4 and 5 are denoted by the same reference numerals. The converting signal generator 25 as illustrated is intended to be used in recording and reproducing according to the VHS standard the color video signal of NTSC color television system. For more detailed information, reference is to be made to Japanese Laid-Open patent application No. 48919/1977.

The luminance signal appearing at the input terminal 39 in the recording operation mode (note: in the reproducing operation, the reproduced luminance signal appears at this terminal) is supplied to a synchronizing signal separating circuit 40 where only the synchronizing signal is separated and fed to a phase comparator 41 and a burst gate circuit 48. The phase comparator 41 is also supplied with a signal having a frequency equal to the horizontal synchronizing signal frequency $f_H$ from a 1/40-frequency divider 42. Thus, the extracted synchronizing signal is compared with the signal of frequency $f_H$ in respect of phase through the phase comparator 41, whereby a deviation or error singal corresponding to the difference resulted from the phase comparison is supplied to a voltage controlled oscillator or VCO (or variable frequency oscillator) 44 of 2.52 MHz which produces a signal having a center frequency equal to $160 \times f_H$. The output signal from the voltage controlled oscillator 44 is supplied to a four-phase signal generator circuit 43 having four output terminals at which four types of signals having a frequency $f_o$ which is equal to $40 \times f_H$ and phase angle of 0°, 90°, 180° and 270°, respectively are produced. One of the four signals (e.g. the signal of phase angle of 0°) is applied to the 1/40-frequency divider 42. Further, the four types of the signals are applied also to a change-over switch circuit 46. The 1/40-frequency divider 42 serves to divide the frequency of the one signal from the four-phase signal generator 43 by 40 to thereby produce the signal having a frequency which is equal to $f_H$, this signal being applied to the phase comparator 41. In this manner, a phase locked loop or PLL is constituted by the phase comparator 41, the voltage controlled oscillator 44, the four-phase signal generator 43 and the 1/40-frequency divider 42, wherein signals synchronized with the synchronizing signal are obtained from the output of these circuit except for the phae comparator 41.

Thus, the output signal from the four-phase signal generator circuit 43 is synchronized with the synchronizing signal and has a frequency $f_o$ which is equal to 40 $f_H$. On the other hand, the output signal from the 1/40-frequency divider 42 is supplied to a ring counter 45 to trigger the latter. The ring counter 45 is of a four-bit capacity and has four outputs among which a given one is at a "high level", while the other outputs are at a "low level". In response to every input of the trigger signal, the "high level" output is successivel shifted in the direction which is controlled by a switching signal from a switching signal input terminal 47.

the switching signal comprises the "high level" and the "low level" alternately for the recordings on the recording tracks. In particular, the switching signal is produced by a rotation phase detector of a rotatable head (refer to Japanese Laid-Open patent application No. 48919/52 recited hereinbefore) and applied to the switching signal input terminal 47. Consequently, the four output signals E1, E2, E3 and E4 of the ring counter 45 will vary such that the "high level" is shifted from the signal E1 to E2, from E2 to E3, from E3 to E4 and from E4 to E1 and so forth, while for the recording on the next track, the "high level" is shifted from E1 to E4, from E4 to E3, from E3 to E2 and from E2 to E1 and so forth. These signals are subsequently appled to the change-over switch circuit 46 for effecting the control in such a manner that one of the four types signals (of phase angles of 0°, 90°, 180° and 270°) available from the four-phase signal generator 43 is produced. For example, when the signal E1 is at "high level", the signal of phase zero is produced. For the signal E2 of "high level", the signal of 90° in phase is produced. For the signal E3 of "high level", the signal of 180° in phase is produced. For the signal E4 of "high level", the signal of 270° in phase is produced. As the consequence, the output signal produced from the change-over switch 46 during the recording on a certain track is advanced by 90° in phase for every horizontal scanning period. In the following, this signal will be referred to as the low band carrier signal for convenience' sake of description.

The low band carrier signal is then supplied to a balanced modulator 51.

On the other hand, the color signal available from the band pass filter 6 is supplied to a change-over switch 52 through a color signal input terminal 56. Upon recording, the change-over switch 52 is closed to a contact REC. Thus, the color signal is supplied to the burst gate circuit 48 by way of the change-over switch 52. The burst gate circuit 48 is additionally supplied with the synchronizing signal from the synchronizing signal separating circuit 40. Under the control of the synchronizing signal, only the color burst signal is separated from the color signal and supplied to one input of the phase comparator 49 which has the other input supplied with a signal having a center frequency equal to the color subcarrier signal frequency $f_c$ from a voltage controlled oscillator 50 or VCO of 3.58 MHz by way of a change-over switch 53 (closed to the contact or pole REC in the recording operation). From the output of the phase comparator 49, a deviation signal corresponding to a difference in phase between the two input signals is produced and fed to the voltage controlled oscillator 50 of 3.58 MHz.

In this manner, a phase-locked loop is constituted by the phase comparator 49 and the voltage controlled oscillator 50 of 3.58 MHz, whereby the output signal from the latter is caused to be synchronized in phase with the color burst signal contained in the color signal. This signal having the frequency $f_o$ is supplied to the balanced modulator 51 and subjected to the low band carrier signal (having the frequency $f_o$) supplied from the change-over switch 46. The output signal from the balanced modulator 51 is then applied to a band pass filter 55 through which only the sum frequency component ($f_c+f_o$) is separated and supplied to a converting signal output terminal 58 to be utilized as the converting signal.

The converting signal of frequency ($f_c+f_o$) is supplied to the balanced modulator 23 and modulated in balance with the color signal of the frequency $f_c$, as the result of which only the difference frequency component, i.e. the frequency component equal to the low band carrier signal (of frequency $f_o$) is separated through the low-pass filter 24 to thereby produce the color recording signal.

The color recording signal is then supplied to the adder 9 (see FIG. 4) through a color recording signal output terminal 60.

The above description concerns the operation for the recording. The reason why a complicated circuit configuration shown in FIG. 6 is employed for deriving the converting signal can be explained by the fact that when the color video signal to be recorded exhibits variation of time base (jitter) in a dubbing operation (i.e., recording a color video signal output from one recording/reproducing apparatus by another recording/reproducing apparatus), the frequency of the low band carrier signal may vary in correspondence to the variation in time base. In this manner, problems concerning change in hue of the reproduced color signal, generation of a low frequency beat and the like which arise upon the dubbing operation can be satisfactorily solved, although detailed discussion on these problems are spared hereat.

By the way, there arises no problem of variation in time base, when an image information as picked-up through the camera is recorded so that the color recording signal can be obtained with a simple recording circuit of the color signal as described hereinafter. Accordingly, so far as the recording circuit is concerned, the complicated circuit configuration such as the one shown in FIG. 6 is not required.

Upon reproduction, the reproduced luminance signal is applied to the associated input terminal 39, whereby the low band carrier signal available through the change-over switch 46 is caused to be in synchronism with the synchronizing signal for the reproduced luminance signal, as is in the case of the recording operation.

On the other hand, the change-over switch 52 and 53 are closed to the side PB for reproduction. Consequently, the reproduced color signal is supplied to the burst gate circuit 48 from the band pass filter 27, while the phase comparator 49 is supplied with a signal having a frequency equal to the color subcarrier frequency $f_c$ from an oscillator 54 of 3.58 MHz.

A phase-locked loop is constituted by the phase comparator 49, the voltage-controlled oscillator 50 of 3.58 MHz, the balanced modulator 51, the band pass filter 55, the converting signal output terminal 58, the balanced modulator 26, the band pass filter 27, the reproduced color signal input terminal 57, the change-over switch 52 and the burst gate circuit 48, resulting in that the frequency of the reproduced color signal is caused to be equal to the output frequency from the oscillator 54 of 3.58 MHz. In other words, the frequency variation of the reproduced color signal which is brought about due to variation in time base in the recording/reproducing system is corrected or compensated.

In the foregoing, an example of the converting signal generator 25 has been described. In this conjunction, it should be noted that the converting signal generator according to an embodiment of the invention and shown in FIG. 5 is destined to be used only for the reproducing operation and thus can be implemented without the circuit elements required for the recording operation such as the change-over switches 52 and 53 and the color signal input terminal 56 shown in FIG. 6.

Next, detailed description will be made on the quadrature phase modulator circuit 28 and the synchronizing signal generator circuit 29 which constitute important parts of the apparatus according to the invention and which are adapted to derive the color recording signal from R-Y signal and B-Y signal without resorting to the frequency conversion.

FIG. 7 shows in a block diagram a combination of the quadrature phase modulator circuit 28 and the synchronizing signal generator circuit 29.

The (R-Y) signal and the (B-Y) signal available from the converter circuit 19 (refer to FIG. 5) are applied to respective input terminals 61 and 62. The (R-Y) signal is then applied to a balanced modulator 64, while the (B-Y) signal is supplied to an adder 63 which has the other input supplied with a pulse signal corresponding to the color burst signal and delivered from an amplitude adjusting device 70. This pulse signal and the (B-Y) signal are added together, whereby the resultant output signal from the adder 63 is supplied to a balanced modulator 65.

On the other hand, the signal produced from an oscillator 73 of 2.52 MHz and having a frequency equal to $160 \times f_H$ (where $f_H$ represents the horizontal scanning frequency) is supplied to a four-phase signal generator circuit 72 which will then produce four output signals having a frequency of $40 \times f_H$ and phase angles of 0°, 90°, 180° and 270°, respectively. These four output signals are applied to a change-over switch 71. Further, one of these four output signals (e.g. the signal of phase "zero") is applied to a 1/20-frequency divider 76. The signal from the frequency divider 76 after undergoing division by 20 is thus a signal having a frequency of $2f_H$ which is then supplied to a ½-frequency divider 75 and the synchronizing signal generator circuit 78.

The ½-frequency divider 75 serves to divide the signal $2 f_H$ by 2 (two) to thereby produce a signal having the frequency $f_H$ which is then supplied to a ring counter 74 and the synchronizing signal generator circuit 78. The ring counter 74 has the other input terminal supplied with the switching signal (not shown in FIG. 5) from the recording/reproducing apparatus through a switching signal input terminal 77 for controlling the ring counter 74 in cooperation with the output signal from the ½-frequency divider 75. The output signals (i.e., four output signals) from the ring counter 74 in turn are supplied to the change-over switch 71 for controlling it.

Since the four-phase signal generator circuit 72, the change-over switch 71 and the ring counter 74 are of structures similar to those of the four-phase signal generator circuit 43, the change-over switch 46 and the ring counter 45 described hereinbefore by referring to FIG. 6, repeated description of these circuits will be unnecessary.

As the consequence, the output signal from the change-over switch 71 is such a signal that the phase thereof is advanced by 90° for every horizontal scanning period during the recording along a given track, while during recording on the next track the signal is delayed by 90° for every horizontal scanning period. In other words, this signal is similar to the output signal from the change-over switch 46 shown in FIG. 6, i.e. similar to the low band carrier signal and for this reason the former will hereinafter be referred to also as the low band carrier signal.

Subsequently, the low band carrier signal is supplied to a balanced modulator 65 and a 90°-phase delay circuit 69 from which a signal delayed by 90° in phase is obtained and fed to the balanced modulator 64. The balanced modulators 64 and 65 are adapted to effect the balanced modulation of the delayed signals with (R-Y) signal and (B-Y) signal, the output signals from the balanced modulators being supplied to the adder 66 from which the color recording signal is produced.

The color recording signal in turn is suppled to a low-pass filter 67 through which harmonic components occurring in a conventional balanced modulator is eliminated. The output signal from the low-pass filter 67 appears at the color recording signal output terminal 68. In this connection, it will be appreciated that harmonic component will not be produced when the balanced modulator is ideally constituted by an analog multiplier. However, the balanced modulator is usually composed of switching elements such as diodes and transistors, giving rise to generation of the harmonic components.

As will be appreciated from the foregoing description, a main feature of the invention resides in that a signal (low band carrier signal) similar to the carrier signal of the desired color recording signal is subjected to the quadrature phase modulation to thereby obtain the color recording signal without resorting to the conventional band conversion of the color signal.

The synchronizing signal generataor circuit 78 serves of course to produce synchronizing signals. To this end, the vertical synchronizing signal is obtained by dividing the output signal (having a frequency of $2 \times f_H$ and produced from a 1/20-frequency divider 76) by divisor of 525, while the horizontal synchronizing signal is derived from a signal $f_H$ obtained from a ½-frequency divider 75. Both the synchronizing signals are synthesized into a desired synchronizing signal which then appears at an output terminal 79. With the aid of the horizontal synchronizing signal, a pulse signal corresponding to the color burst signal is obtained and supplied to the amplitude adjusting circuit 70. The pulse signal imparted with an appropriate amplitude value (as will hereinafter be described) through the amplitude adjusting circuit 70 is subsequently supplied to the adder 63. As the alternative for preparing this burst signal, the carrier of -(B-Y) axis (corresponding to the polarity inversion of the input carrier to the balanced modulator 65) may be gated to be added downstream of the adder 66.

In the foregoing, the quadrature phase modulator circuit 28 and the synchronizing signal generator circuit 29 have been described in detail. Next, in order to make clear the difference between the apparatus according to the invention and the prior art, the quadrature phase modulator circuit 21 and the synchronizing signal generator circuit 20 shown in FIG. 4 will further be described more specifically.

Figure 8:
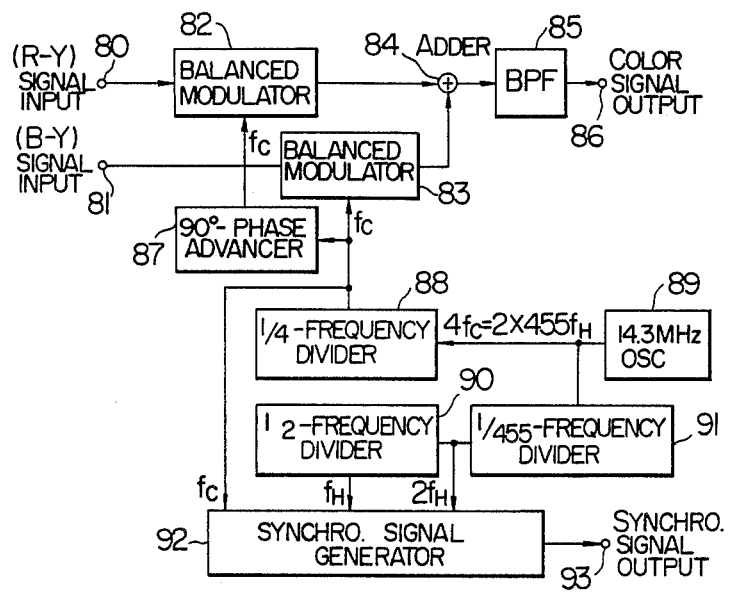
FIG. 8 shows in a block diagram a hitherto known circuit arrangement which corresponds to the one shown in FIG. 7.

Referring to FIG. 8 which shows in a block diagram the quadrature phase modulator circuit 21 and the synchronizing signal generator 20 more in detail, the (R-Y) signal and the (B-Y) signal are supplied to balanced modulators 82 and 83 through input terminals 80 and 81, respectively. On the other hand, the color subcarrier signal having a frequency $(f_c = 455/2. f_H)$ available from the output of a ½-frequency divider 88 is supplied to both the balanced modulator 83 and a 90°-phase advancer circuit 87 which functions to advance the phase of the input signal by 90°. The phase-advanced output signal therefrom is applied to the balanced modulator 83. At the balanced modulators 82 and 83, the respective input signals undergo the balanced modulation with the (R-Y) signal and the (B-Y) signal. The output signals from the balanced modulators 82 and 83 are added together through the adder 84, whereby the color signal is then supplied to a band pass filter 85 through which harmonic components produced due to the balanced modulation are eliminated. The color output signal from the filter 85 thus appears at a color signal output terminal 86.

On the other hand, the signal of frequency $4 f_c$ (where $f_c$ represents the frequency of the color subcarrier) is supplied from an oscillator 89 of 14.3 MHz to the ¼-frequency divider 88 and a 1/455-frequency divider 91. At the output terminal of the ¼-frequency divider, the color subcarrier is produced, while a signal of frequency $2 f_H$ is obtained at the output of the 1/455-frequency divider 91. The output signal from the 1/455-frequency divider 91 is supplied to a ½-frequency divider 90 and a synchronizing signal generator circuit 92. From the output of the ½-frequency divider, the signal frequency $f_H$ is obtained and supplied to the synchronizing signal generator circuit 92 which then produces at an output terminal 93 the synchronizing signal in the same manner as described hereinbefore in conjunction with FIG. 7.

The synchronizing signal contains the color burst signal. The latter can be obtained by gating the color subcarrier signal from the ¼-frequency divider 88 with the aid of a gate signal prepared on the basis of the horizontal synchronizing signal.

Now, detail of the quadrature phase modulator 21 and the synchronizing signal generator circuit 20 according to the prior art and shown in FIG. 4 has been elucidated. It will be noted that the apparatus according to the invention shown in FIG. 7 differs from the prior art in respect of the 90°-phase advancer circuit 87 shown in FIG. 8 and the 90°-phase delay circuit 69 shown in FIG. 7.

Figure 9:
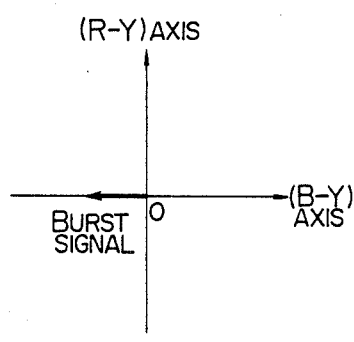
FIGS. 9 and 10 are to illustrate differences in operation between the circuit arrangements shown in FIGS. 7 and 8.
Figure 10:
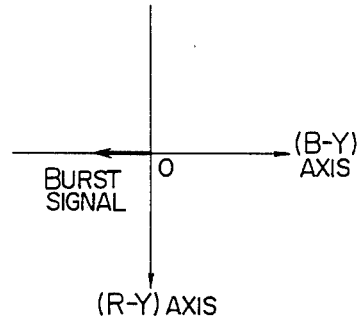

To say alternatively, in the circuit shown in FIG. 8, the (R-Y) signal is modulated in balance with the carrier signal of (R-Y) axis advanced by 90° relative to the (B-Y) axis as is illustrated in FIG. 9, while in the circuit shown in FIG. 7, the (R-Y) signal is modulated in balance with the carrier signal of (R-Y) axis which is delayed by 90° relative to the (B-Y) axis, as is illustrated in FIG. 10.

More specifically, in the case of the circuit shown in FIG. 7 and implemented according to an embodiment of the invention, the color recording signal such as the one derived from the color signal through the convertion to the low band is obtained directly from the (R-Y) signal and (B-Y) signal. Thus, it is required to verify in what mannner the color recording signal behaves.

When the (R-Y) signal and the (B-Y) signal are represented by $E_R$ and $E_B$, respectively, the color signal $E_C$ and be expressed as follows;

$$E_C = E_B \sin \omega_c t + E_R \cos \omega_c t \quad (1)$$

where t represents time and $\omega_c$ is angular frequency of the color subcarrier signal.

Further, it is assumed that the converting signal E1 is expressed as follows;

$$E_1 = \sin \omega_1 t \quad (2)$$

Where $\omega_1$ represents the angular frequency.

Under the condition, the signal E2 having undergone the balanced modulation for the conversion to the low band can be expressed as follows;

$$E_2 = E_C \cdot E_1 = E_B \sin\omega_1 t \sin\omega_c t + E_R \sin\omega_1 t \cdot \cos\omega_c t = \quad (3)$$

$$\frac{1}{2} E_B \{\cos(\omega_1 - \omega_c)t - \cos(\omega_1 + \omega_c)t\} +$$

$$\frac{1}{2} E_R \{\sin(\omega_1 - \omega_c)t + \cos(\omega_1 + \omega_c)t\}$$

Though the low-pass filter, only the ($\omega_1 - \omega_c$) component is separated, whereby the color recording signal $E_O$ can be obtained which is expressed as follows;

$$E_O = E_B \cos(\omega_1 - \omega_c)t + E_R \sin(\omega_1 - \omega_c)t \quad (4)$$

where the coefficient of ½ is ommitted for convenience of description.

Since the angular frequency $\omega_0$ of the carrier signal of the color recording signal is give by the following expression;

$$\omega_0 = \omega_1 - \omega_c \quad (5)$$

where $\omega_1 > \omega_c$, the color recording signal $E_O$ can be expressed as follows;

$$E_O = E_B \cos \omega_0 t + E_R \sin \omega_0 t \quad (6)$$

For comparison with the color signal $E_C$, it is assumed that the signal $E_O$ the phase of which is delayed by 90° is again represented by $E_O$, then the following expression applies valid.

$$E_O = E_B \sin \omega_0 t - E_R \cos \omega_0 t \quad (7)$$

As will be self-explanatory, the signal the phase of which has been varied by a predetermined amount exhibits essentially no difference relative to the original signal. This is because the hue is determined by the relative phase between the phases of the color burst and the color signal and that the relative phase remains unchanged even when the color signal inclusive of the color burst signal is shifted in phase by a given amount.

The expressions (1) and (7) are again cited below for comparison.

$$E_C = E_B \sin \omega_c t + E_R \cos \omega_c t \quad (1)$$

$$E_O = E_B \sin \omega_0 t - E_R \cos \omega_0 t \quad (7)$$

It will be seen that the sign of the second terms differ from each other, which means that the (R-Y) axis is inverted, as described hereinbefore.

For this reason, in the case of the apparatus shown in FIG. 7, the 90°-phase delay device 69 is used. As the alternative, a 90°-phase advancer circuit may be used in place of the 90°-phase delay device, thereby to invert the polarity of the (R-Y) signal which is then supplied to the balanced modulator 64. As can be seen from the expression (7), this method also allows the desired signal $E_O$ to be obtained but required additionally a polarity inverter circuit for inverting the polarity of the (R-Y) signal, which is unpreferable from the view point of the circuit technology.

The phase relationship of the low band carrier signals supplied to the balanced modulators 64 and 65 has now been described. Although the means for preparing the converting signal of the frequency ($f_c + f_o$) is adopted for obtaining the color recording signal through the low-band conversion of the color signal, there is conceivable a method according to which the frequency difference ($f_c - f_o$) is utilized. In other words, use is made of a signal having a frequency lower than $f_c$. In this case, the color recording signal $E_O$ can be expressed as follows;

$$E_O = E_B \sin \omega_0 t + E_R \cos \omega_0 t \quad (9)$$

Since the sign of the second term is same as that of the expression (1), the 90°-phase delay device 69 shown in FIG. 7 has to be replaced by a 90°-phase advancer circuit, as is in the case of the arrangement shown in FIG. 8. In this case, it should however be noted that the compatibility with the conventional VHS or β systems will be lost. In order to assure such compatibility, it is thus necessary to utilize the converting signal ($f_c + f_o$).

Now, referring again to FIG. 7, the amplitude adjusting circuit 70 and the adder 63 will be described in detail. These circuits serve for generating the color burst signal of the color recording signal.

Figure 11:
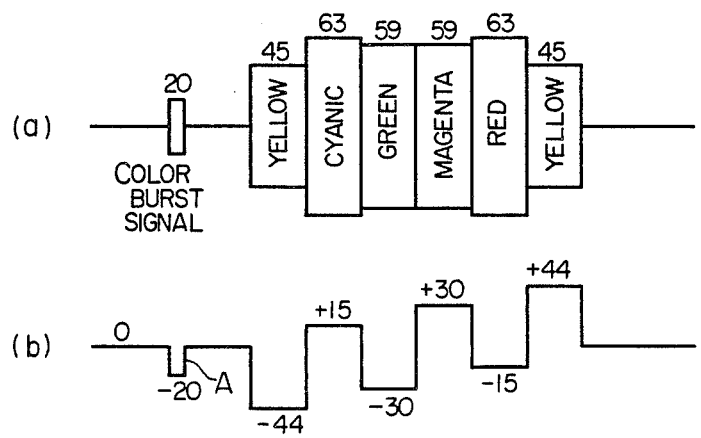
FIG. 11 is a signal waveform diagram for illustrating operation of a portion of the circuit shown in FIG. 7.

A waveform of the color signal in the case of a standard color bar signal is illustrated in FIG. 11 at (a). The attached numerals indicate the amplitude of individual color signals on the assumption that the amplitude of the color burst signal is represented by 20 (twenty). When this color signal is synchronously detected by the signal of (B-Y)-axis, then a signal having a waveform illustructed in FIG. 11 at (b) is obtained. In FIG. 11 at (b), the attached numerals indicate D.C. levels. As will be appreciated from FIG. 11 (b), the (B-Y) signal corresponding to the color burst signal is a pulse signal of negative polarity such as a pulse A. When the synchronous detection is performed with the (R-Y) axis, the burst level become zero. Thus, when the pulse signal having such level variation as illustrated in FIG. 11 at (b) is added to the (B-Y) signal and subjected to the balanced modulation, this means equivalently that the color burst signal has been inserted. To this end, the pulse signal from the synchronizing signal generator circuit 78 is adjusted in level by the amplitude adjusting circuit 70 and added to the (B-Y) signal through the adder 63. The level adjustment is effected in such a manner that the level variation illustrated in FIG. 11 at (b) can be attained when a standard color bar pattern is picked up by the camera.

The circuit for inserting the color burst of the color recording signal has been described. As an alternative, the color burst signal may be obtained by gating the low band carrier signal from the change-over switch 71 and applying to the adder 66.

Next, comparison will be made as to the circuit arrangements shown in FIGS. 7 and 8 with a view to making clearer the distinction of the invention from the prior art.

Referring to FIG. 8, the reference oscillator for producing the synchronizing signal and the color subcarrier, namely the oscillator 89, has a relatively high oscillating frequency, thereby giving rise to complexity in the construction of the frequency division circuit for obtaining the frequency signal of 2 $f_H$. In contrast, in the case of the arrangement shown in FIG. 7, the signal of frequency 2 $f_H$ is derived from a relatively low frequency source (2.52 MHz). Thus, the construction of the frequency division circuit can be correspondingly simplified.

However, since the arrangement shown in FIG. 7 includes additionally the four-phase signal generating circuit 72, the ring counter 74 and the change-over switch 71, the circuit will be correspondingly complicated. Nevertheless, the circuit shown in FIG. 7 can be implemented through integrating technique equivalently to the circuit shown in FIG. 8 which is usually implemented in the form of an integrated circuit.

A remarkable difference between the present invention and the prior art can thus be found in that the recording circuit required heretofore (refer to FIG. 6) can be substantially eliminated according to the teachings of the invention, to a great advantage.

Next, description will be made on another exemplary embodiment in which a circuit suited to be implemented in an integrated circuit is employed in place of the 90°-phase delay device 69 shown in FIG. 7.

The conventional 90°-phase delay device is composed of reactance elements such as inductor, capacitor and the like and thus not suited for integration.

Figure 12:
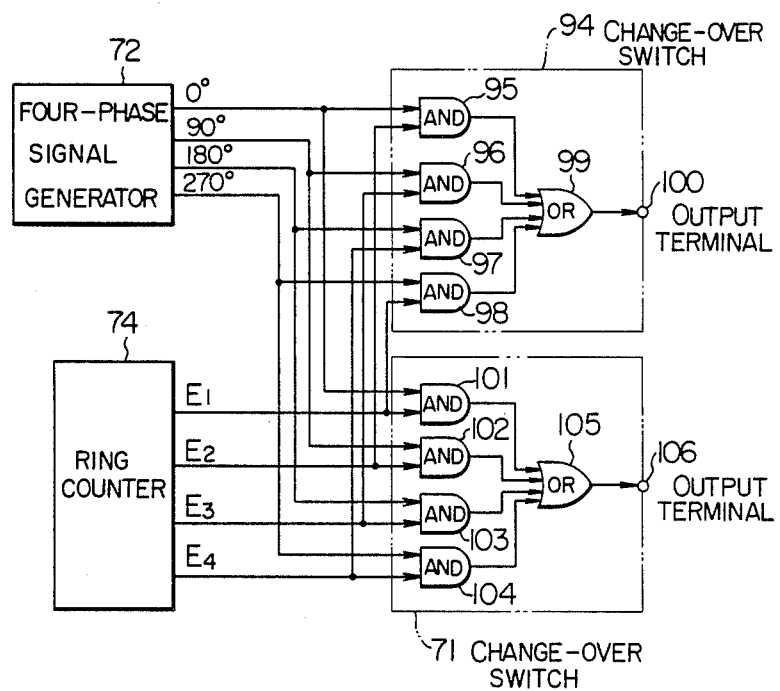
FIG. 12 is a block diagram showing a modification of a portion of the circuit shown in FIG. 7.

A circuit arrangement composed of digital circuits suited to be implemented in an integrated circuit is shown in FIG. 12. For convenience of description, there are also shown the four-phase signal generator citcuit 72, the ring counter 74 and the change-over switch 71. It is to be noted that a change-over switch 94 corresponds to the 90°-phase delay device.

The signals of phase angles 0°, 90°, 180° and 270° delivered from the four-phase signal generator circuit 72 are supplied to AND circuits 95 to 98 and 101 to 104, respectively, as is illustrated in FIG. 12.

On the other hand, the four output signals E1, ..., E4 delivered from the ring counter 74 are supplied to the AND circuits 95 to 98 and 101 to 104 which are thus enabled to produce the four-phase signals successively on one-by-one basis. The output signal from the AND circuits is then applied to output terminals 100 and 106 through OR circuits 99 and 105 as the low band carrier signal.

By the way, when the signal E1 is at "high level", only the input signals to the AND gates 98 and 101 are output, whereby the signal of 270° in phase appears at the output terminal 100, while the signal of phase "zero" appears at the output terminal 106. In a similar manner, when the signal E2 is at "high level", the signal of phase "zero" is applied to the output terminal 100, while the terminal 106 is supplied with the signal of 90° in phase. When the signal E3 is at "high level", the signals of 90° and 180° in phase are supplied to the output terminals 100 and 106, respectively. For the signal E4 of "high level", the signals of 180° and 270° in phase are produced.

In any case, the output signal appearing at the output terminal 100 is always delayed by 90° in phase relative to the output signal appearing at the output terminal 106. It can thus be said in the equivalent sense that the similar effect attained by passing the output signal 106 through the 90°-phase delay device can be accomplished with the digital circuit described above.

In the foregoing, the embodiment of the invention shown in FIG. 5 and the individual associated parts have been described in detail. As will be appreciated, the invention starts from the recording system in which the color video signal is separated into a luminance signal and color signals which are then subjected to appropriate processings to be converted into a recording signal suited to be recorded on a recording medium and proposes a color signal recording circuit which is of a much simplified structure as compared with the higherto known circuit and which allows the color recording signal to be obtained by modulating directly a predetermined carrier signal with color information signal available from the image camera (e.g. R-Y signal, I-signal and Q-signal or the like signals).

Accordingly, in the case where the color video signal of the system other than NTSC system (e.g. of PAL or SECAM system) is to be recorded and reproduced through other recording/reproducing system (e.g., β-system or the like), the concept similar to the one incarnated in the embodiment shown in FIG. 5 (in which the color video signal of NTSC system is recorded and reproduced by VHS system) can be equally adopted.

By way of example, description will be made on an exemplary embodiment where the color video signal of NTSC system is recorded and reproduced through the β-system.

In this case, the fundamental concept as well as the general circuit arrangement are similar to those illustrated in FIG. 5. Accordingly, description will be limited to only the different components, i.e. the quadrature phase modulator circuit 28 and the synchronizing signal generator circuit 29.

Further, the color signal reproducing circuit accommodated in the external accessary device 38 is also one of the different components. However, since the circuit disclosed in Japanese laid-open patent application No. 104824/1975 can be used to this end, description of this circuit will be omitted.

FIG. 13 shows in a block diagram another exemplarly embodiment of the quadrature phase modulator circuit and the synchronizing signal generator circuit. In this figure, the same elements as those shown in FIG. 7 are attached with the same reference numerals and detailed description of these elements will be omitted.

Referring to FIG. 13, the signal derived from an oscillator 107 of 5.5 MHz and having a frequency of $2 \times 175 f_H$ (where $f_H$ represents the horizontal scanning frequency) is supplied to a ½-frequency divider 108 and a 1/175-frequency divider 115. The 1/175-frequency divider serves to divide the above frequency signal by 175 (divisor) to produce a frequency signal of $2 f_H$ which is then applied to the ½-frequency divider 116 and the synchronizing signal generating circuit 78. The frequency divider 116 divides the signal ($2 f_H$) by 2 to produce the frequency signal of $f_H$ which is subsequently fed to a ½-frequency divider 117 and the synchronizing signal generator circuit 78. The ½-frequency divider 117 divides this frequency signal by 2 to thereby produce a signal of frequency ½ $f_H$ which is supplied to an AND circuit 114.

In this way, the synchronizing signal generating circuit 78 is supplied with the signals of frequencies of $f_H$ and $2 f_H$ and produces the synchronizing signal to the output terminal 79 in a similar manner as described hereinbefore in conjunction with FIG. 7. Further, this circuit 78 produces a pulse signal for the color burst signal which is applied to the amplitude adjusting circuit 70.

A ⅛-frequency divider 108 serves to divide the input frequency by 8 to produce a signal having a frequency of $(44-\frac{1}{4}) f_H$ which is then supplied to an inverter 109 and an AND circuit 112. The inverter 109 serves to invert the phase of the output signal from the ⅛-frequency divider 108 and supplies the inverted signal to an AND circuit 111.

In this way, the AND circuits 112 and 111 are supplied with the output signal from the ⅛-frequency divider 108 and the corresponding signal of the inverted phase, respectively.

The switching signal applied to the associated input terminal 77 is a rectangular signal in which "high level" alternates with "low level" for every recording track in such a manner that the switching signal is at "high level" during the recording on a certain track and changed to "low level" upon recording on the next track and so forth.

This switching pulse signal is supplied to an AND circuit 114 having other input supplied with a frequency signal of ½ $f_H$ produced from the ½-frequency divider 117. As the result of the logic AND function, there are produced at the output of the AND circuit 114 a low level signal in response to the switching signal of "low level" and a signal having "high level" alternated with "low level" for a signal horizontal scanning period when the switching signal is at "high level".

The output signal from the AND gate 114 is supplied to the AND gate 112 and the inverter 110. The latter inverts the phase of this signal and supplies it to the AND circuit 111. Thus, the signal output from the ⅛-frequency divider 108 and applied to the AND circuit 112 is allowed to pass therethrough and supplied to an OR circuit 113 when the output signal from the AND circuit 114 is at "high level", while the signal output from the inverter 109 and supplied to the AND circuit 111 is allowed to pass therethrough and supplied to the OR circuit 113 when the output signal from the inverter 110 is at the "high level". In this way, the output signal from the OR circuit 113 corresponds to the output signal from the ⅛-frequency divider 108 when the output signal from the AND circuit 114 is at "high level", while the inverted signal of the output signal from the divider 108 is produced from the OR circuit 113 when the output signal from the AND circuit 114 is at the low level. In other words, the output signal from the OR circuit 113 literally corresponds to the signal of the frequency $(44-\frac{1}{4}) f_H$ during a recording on a given track, while corresponding to the same signal but having the phase inverted for every horizontal scanning period during the recording on the next track. This signal is subsequently applied to the balanced modulator 65 and the 90°-phase shifter 69, whereby the desired color recording signal is obtained from the (R-Y) signal and (B-Y) signal and produced from the color recording signal output terminal 68.

In the above description, it has been assumed that the principle of the invention is applied to the recording and reproducing system of β-type. However, it will readily be understood that the invention can be equally applied to other systems and makes it possible to implement the color signal recording circuit of a much simplified structure as compared with the hitherto known ones.

The recording of the color video signal of the PAL system may be accomplished in a manner similar to the recording of the signal of NTSC system. The color signal of PAL system has (R-Y) signal component the phase of which is inverted for every horizontal scanning period. when such PAL signal is to be recorded by a video tape recorder of VHS system, the signal is subjected to frequency conversion to a low band. For the track to be recorded by one of two rotary heads, the signal is recorded without rotation of the phase thereof, while upon recording on a track by the other head, the carrier signal is recorded with the phase thereof being rotated by 90° for every horizontal scanning period. Upon reproduction, cross-talk component is eliminated by 2H delay line. In this sytem, the camera and the video tape recorder can be integrally combined with each other in a similar manner as is in the case of NTSC system.

The system SECAM differs essentially from the systems NTSC and PAL in that the (R-Y) signal and the (B-Y) signal alternate with each other for every horizontal scanning period. In other words, the color signal is obtained through frequency-modulation of the line sequential signal. For the recording system, a handy or easy type video tape recorder generally adopts the low-band conversion for obtaining the color recording signal through the frequency conversion to a low band as is in the case of NTSC and PAL systems.

Next, an embodiment of the invention applied to SECAM system will be described.

Since the general arrangement of this embodiment is similar to the one shown in FIG. 5, description will be limited to the different components, namely those corresponding to the quadrature phase modulator 28 and the color signal reproducing circuit accommodated in the external accessary device 38.

Referring to FIG. 14 which shows in a block diagram a circuit for obtaining the color recording signal, the (R-Y) signal and (B-Y) signal applied to input terminals 118 and 119, respectively, are supplied to adders 120 and 121 where these signals are added with a discriminating signal produced from a discriminating signal generator 129. The output signals from the adders 122 and 123 are then supplied to pre-emphasis circuits 122 and 123, respectively. The discriminating signal serves to discriminate correlation between the horizontal scanning period and the color signals (R-Y signal and B-Y signal) and is available only during a predetermined time of the vertical blanking period and the porch of the horizontal blanking period, as is well known in the art. Further, since the discriminating signal as well as the generator 129 therefor are known, description will be omitted hereat.

The pre-emphasis circuit 122 and 123 effect pre-emphasis operation in accordance with the associated standard. The outputs from these circuits 122 and 123 are supplied to a change-over switch 124 which is adapted to be controlled by a control signal in such a manner that the line sequential signal is produced from the output terminal of the switch 124. The output signal from the change-over switch 124 is supplied to a frequency modulator 125, the frequency-modulated output therefrom being supplied to a bell filter 126. It will be noted that the frequency modulator 125 is supplied with a low band carrier signal from a corresponding generator circuit 130 so that the frequency-modulated signal has a predetermined frequency. The low band carrier signal is similar to the reference carrier signal for the color recording signal obtained through the band conversion of the color signal to a predetermined frequency band in accordance with the adopted recording system.

For example, in the case of SECAM III-b system being adopted at present, the frequency of the reference carrier signal is different for every horizontal scanning period and is 4.25 MHz (=272 $f_H$) and 4.40625 MHz (=282 $f_H$), difference in frequency being thus equal to 10 $f_H$ where $f_H$ represents the horizontal scanning frequency of 15.625 KHz. Correspondingly, the low band carrier signal frequencies are $f_O$ and ($f_O$+10 $f_H$), where $f_O$ may be an appropriate frequency such as 800 KHz, for example. Since the frequency modulator 125 is implemented in a similar manner as the frequency modulator for obtaining the SECAM color signal and known in the art, further description of this modulator will be necessary. It should however be mentioned that the frequency modulator is composed of a D.C. shift circuit, a clip circuit, a frequency correcting circuit and the like.

Through the bell filter 126, the side band signal of the input frequency-modulated signal is emphasized and the output from this filter is supplied to a low-pass filter 127.

The bell filter 126 is imparted with characteristics which comform to the standard (for the color signal).

The low-pass filter 127 eliminates harmonic components to thereby produce a color recording signal to an associated output terminal 128.

Next, the color signal reproducing circuit will be described by referring to FIG. 15. A reproducing signal applied to an input terminal 129 therefor is supplied to a low-pass filter 131 where only the reproduced color recording signal is separated and fed to a balanced modulator 140 which has the other input applied with a signal of a frequency equal to a sum ($f_O+f_C$) of the color signal carrier frequency $f_C$ and the color recording signal carrier frequency $f_O$ from an oscillator 152. The sum signal and the reproduced color recording signal are modulated in balance and only the difference frequency component (component of $f_C$) between these two signal frequencies is separated through a band pass filter 150 and is transferred to an output terminal 151 as the reproduced color signal.

These has been described an embodiment of the invention applied to SECAM system, wherein the color signal is obtained through the frequency conversion of the color signal to a low band. Alternatively, it is possible to derive the color recording signal of the low frequency band through frequency division (by 4, for example) of the color signal. In this case, the circuit for obtaining the color recording signal may be implemented in a manner similar to what is shown in FIG. 14 with only the low band carrier signal frequency being different.

By way of example, when the frequency of the color signal is divided by the divisor of 4 to obtain the color recording signal, the low band carrier signal frequency $f_{01}$ and $f_{02}$ mentioned below are employed.

$$f_{01} = 4.25/4 = 1.0625 \text{ MHz} = 68 \ f_H$$

$$f_{02} = 4.40625/4 = 1.1015625 \text{ MHz} = 70.5 \ f_H$$

where $f_H$ represents the horizontal scanning frequency.

Further, the color signal reproducing circuit differs from the one shown in FIG. 15 and is composed of a low-pass filter for separating the color recording signal from the reproduced signal, a four-multiplying circuit for multiplying the color recording signal output from the low-pass filter by 4, and a band pass filter for obtaining the reproduced color signal by eliminating unwanted components from the signal output from the four-multiplying circuit.

As the further alternative, it is conceivable to effect the recording in such a manner that the frequency spectrum of the color recording signal is frequency-interleaved between the adjacent recording tracks in the SECAM system as is in the case of NTSC system and PAL system. In the SECAM system, the color or chrominance signal is a line sequential signal and has a significant correlation between two horizontal scanning periods, wherein the frequency spectra are distributed such that high energy level occurs for every $\frac{1}{2} f_H$ were $f_H$ represents the horizontal scanning frequency. Accordingly, the frequency interleave can be accomplished by making the frequency-modulated carrier frequency to differ by $\frac{1}{4} f_H$ between the adjacent tracks.

In the foregoing, the exemplary embodiment of the invention have been described. The general or fundamental arrangement of the apparatus according to the invention is shown in FIG. 5. Although it has been assumed that the devices and circuits included in the circuit chains extending between the photoelectric transducer 2 to the adder 30 for obtaining the luminance signal and the quadrature phase modulator circuit 28 for deriving the color recording signal constitute the image camera device 1 which is distinguished from the recording and reproducing apparatus, it should be understood that such distinction is only for the convenience' sake of description. In practice, the image pick-up device may be assumed to be composed only of the photoelectric transducer 2 with the remaining components being belonged to the recording and reproducing apparatus.

Further, although the arrangement shown in FIG. 5 is so implemented as to be suited for performing the reproduction immediately after the image pick-up and the recording, it will be appreciated that the reproducing circuit may be spared when only the image pick-up and the recording are to be performed. In such case, the apparatus according to the invention is advantageous over the conventional system.

The foregoing description primarily concerns the color signal processing in the VHS system in which the recording is performed without providing guard band between the recording tracks in order to attain a high recording density, thus resulting in the necessity for the relatively complicated color signal processing procedures. It will however be understood that the invention can be equally applied to such a system in which the color signal is simply frequency-converted to a low band with the guard band being provided between the recording tracks (e.g., EIAJ-TYPE I system). In this case, the carrier signal $f_{\phi C}$ input to the balanced modulators 64 and 65 shown in FIG. 7 may be a signal having no phase rotation, while the circuits 71, 72, 73 and 74 may be replaced by a single oscillator to a more simplification of the apparatus.

It will now be understood that, according to the invention, a color signal recording circuit of much simplified arrangement as compared with the hitherto known color signal recording circuit is accomplished and makes a great contribution to the realization of the portable recording and reproducing apparatus combined with an image camera of a small size and a light weight as desired.

What is claimed is:

1. An integrated system including an image camera and recording circuit for recording on video tape a color video signal including a color recording signal occupying a frequency band of relatively low frequency and a luminance recording signal occupying a frequency band higher than the frequency band occupied by the color recording signal, without forming a conventional composite color television signal as an intermediate step in producing the color video signal, comprising:

converter means for converting signals representative of the primary colors R, G and B into a luminance signal Y, an R-Y color difference signal, and a B-Y color difference signal;

synchronizing signal generator means for generating a synchronizing signal containing at least a horizontal synchronizing signal, a vertical synchronizing signal and a first carrier signal, the frequency of said first carrier signal being selected to be appropriate for directly recording the color recording signal on video tape;

adder means for combining the luminance signal Y with the synchronizing signal to produce a luminance output signal;

modulation means for modulation of the luminance output signal with a second carrier signal having a higher frequency than said first carrier signal to produce a luminance recording signal, the frequency of the second carrier signal being selected to be appropriate for the direct recording of the luminance recording signal on video tape in a relatively high frequency band;

quadrature phase modulator means responsive to the color difference signals and the first carrier signal for modulating the phases of said color difference signals to produce a color recording signal for direct recording on the video tape in a relatively low frequency band; and adder means for receiving the luminance recording signal in a relatively high frequency band and the relatively low frequency color recording signal for producing the color video signal for recording on video tape without forming a conventional composite color television signal as an intermediate step in producing said color video signal.

2. The integrated system of claim 1 further including a picture monitor means and means for applying said luminance output signal to said picture monitor so that the color video signal can be monitored during recording.

3. An integrated system for recording a color video signal on video tape without forming a composite color television signal as an intermediate step in producing the color video signal, comprising:

image pick-up means responsive to a color image for separately producing at least a luminance signal and a chrominance signal including R-Y and B-Y components in accordance with an image picked up thereby;

means for producing a color recording signal for direct recording on video tape, including means for generating a pulse signal corresponding to a color burst signal, first adder means coupled to receive said B-Y component of said chrominance signal and said pulse signal for producing a first adder output signal, means for producing a low band carrier signal having a frequency selected to be in a relatively low frequency band at a predetermined multiple of the horizontal scan frequency and to be appropriate for the direct recording of the color recording signal on the video tape, first modulator means coupled to receive said low band carrier signal and the output of said first adder means, second modulator means coupled to receive said low band carrier signal and the R-Y component of said chrominance signal, and means coupled to receive the output of said first and second modulator means for producing said color recording signal;

means for producing a luminance recording signal, including means for generating a synchronizing signal, second adder means coupled to receive said luminance signal and said synchronizing signal for producing a luminance output signal, and third modulator means coupled to receive said luminance output signal and a high band carrier signal for modulating said luminance output signal to produce a luminance recording signal, the frequency of said high band carrier signal selected to be appropriate for directly recording the luminance recording signal on video tape in a relatively high frequency band;

third adder means coupled to receive said luminance and color recording signals for producing a color video signal; and means responsive to said color video signal for recording said color video signal on video tape without forming a conventional composite color television signal as an intermediate step in producing the recorded color video signal.

* * * * *